United States Patent [19]

Bugg et al.

[11] Patent Number: 4,552,202

[45] Date of Patent: Nov. 12, 1985

[54] ALKALI METAL SILICATE SOLUTIONS AND METHOD OF FORMING FOUNDRY PRODUCTS USING THE SOLUTIONS

[75] Inventors: John W. J. Bugg, Leeds; Stephen Houlden, Pudsey, both of England

[73] Assignee: The White Sea & Baltic Company Limited, England

[21] Appl. No.: 433,132

[22] PCT Filed: Feb. 19, 1982

[86] PCT No.: PCT/GB82/00043

§ 371 Date: Sep. 30, 1982

§ 102(e) Date: Sep. 30, 1982

[87] PCT Pub. No.: WO82/02844

PCT Pub. Date: Sep. 2, 1982

[30] Foreign Application Priority Data

Feb. 20, 1981 [GB] United Kingdom ............... 8105434

[51] Int. Cl.$^4$ .......................... B22C 1/18; C01B 33/32
[52] U.S. Cl. .................................. 164/528; 106/38.35
[58] Field of Search ............................. 164/522, 528; 106/38.35

[56] References Cited

U.S. PATENT DOCUMENTS

| 3,135,029 | 6/1964 | Cooper et al. ............... 164/528 |
| 3,179,523 | 4/1965 | Moren .......................... 106/38.35 |
| 3,428,464 | 2/1969 | Pollard ....................... 106/38.35 X |
| 4,070,196 | 1/1978 | Kraak et al. ................. 106/38.35 |
| 4,341,559 | 7/1982 | Friedemann et al. ........ 106/38.35 |

FOREIGN PATENT DOCUMENTS

| 2856267 | 7/1980 | Fed. Rep. of Germany . |
| 53-30922 | 3/1978 | Japan ............................ 164/528 |
| 54-107829 | 8/1979 | Japan ............................ 164/528 |
| 54-116327 | 9/1979 | Japan ............................ 164/528 |
| 55-40036 | 3/1980 | Japan ............................ 164/522 |
| 55-77956 | 6/1980 | Japan ............................ 164/522 |
| 745402 | 2/1956 | United Kingdom ......... 106/38.35 |
| 1518772 | 7/1978 | United Kingdom . |

OTHER PUBLICATIONS

Chemical Abstracts, vol. 86, No. 20, May 16, 1977, p. 140, Abstract 142342n.
Chemical Abstracts, vol. 92, No. 12, Mar. 24, 1980, p. 117, Abstract 96294x.

*Primary Examiner*—Nicholas P. Godici
*Assistant Examiner*—J. Reed Batten, Jr.
*Attorney, Agent, or Firm*—Lawrence Rosen

[57] ABSTRACT

Aqueous alkali metal silicate solutions are made by dissolving an alkali silica powder that includes insoluble impurities and putting the impurities into stable suspension with a suspending agent such as a cellulose derivative. When used as a foundry binder the solutions give improved early strength and improved breakdown properties.

7 Claims, No Drawings

ALKALI METAL SILICATE SOLUTIONS AND METHOD OF FORMING FOUNDRY PRODUCTS USING THE SOLUTIONS

Aqueous sodium silicate solutions are widely used as binders in the production of foundry moulds or cores. Large volumes of the binder are used by a foundry and it is obviously preferable that it should be made by an inexpensive process.

Accordingly such solutions are normally made by melting sand and soda ash at a temperature of around 1450° C., crushing the resultant glass and dissolving it in water, and if necessary evaporating the resultant solution to the desired solids content. While offering a relatively low cost material for foundry use, the process suffers from the disadvantages that it requires expensive apparatus and, in particular, high energy input.

It is known that aqueous sodium silicate can be formed by dissolving very fine particulate silica (fumed silica such as the material sold under the trade name "Aerosil") in aqueous sodium hydroxide. However the cost of producing the fumed silica is so high that this process is not commercially practicable for the production of binder solutions. It is also known that impure particulate silica can be used to form solutions of sodium silicate. Thus it is disclosed in Chemical Abstract Vol. 86 1977 No. 142342n and in Japanese Application No. 75/44686 that silicon dioxide dust form ferroalloy smelting may be heated with aqueous sodium hydroxide in the presence of an anionic, non-ionic or amphoteric surfactant to prevent viscosity increase, and these additives are also proposed in German OLS No. 2856267. In Chemical Abstracts Vol. 92 1980 No. 96294x and in Japanese Application No. 7855634 it is described that dust from ferrosilicon manufacture may be reacted with sodium hydroxide to form a product that can be used for preparing casting moulds.

Although this latter abstract states that the product is stable in fact dust collected from manufacturing ferrosilicon will normally contain insoluble impurities and in practice these will inevitably tend to settle out from the main solution.

British Patent Specification No. 1518772 also describes the use of the dust and states that impurities can be removed using a press filter. It also alleges that binders made from the dust give products of greater water resistance, irrespective of whether or not the binder is purified. Any such improvement must therefore be due solely to the pressure of dissolved impurities and so the filtered, undissolved, impurities are regarded as having no effect on bonding properties.

In commercial practice it is absolutely essential that the solution should be of completely uniform composition throughout and that it does not deposit a precipitate or coating on equipment used for storing or transporting it, for instance drums or pipes. If it is not of completely uniform composition its use will lead to variable results, and this is intolerable in practice. If precipitates or coatings are formed on equipment this can clog the equipment and this again is intolerable. If such precipitates or coatings are formed they have to be removed and disposed of, and this can be difficult and costly because they are contaminated with alkali metal silicate. Accordingly although these proposals have been made to use dust contaminated with impurities in practice they are not commercially satisfactory.

It has been our object to provide an alkali metal silicate solution using low cost raw materials and methods and which can be suitable for use as a binder for foundry moulds.

The invention is based on the surprising discoveries that it is possible to put the insoluble impurities into stable suspension in the solution, and that when such solutions are used in foundry processes they give a very desirable improvement in initial strength and a very desirable decrease in retained strength after use.

In the invention an aqueous alkali metal silicate solution is made by a method comprising dissolving in aqueous alkali a silica powder containing impurities that are insoluble in aqueous alkali and suspending the impurities as a stable suspension in the solution by means of a suspending agent.

An aqueous alkali metal silicate solution according to the invention contains a stable suspension of particulate impurities held in the suspension by means of a suspending agent.

These solutions may be used for various purposes but it is particularly preferred that they should be suitable for use as binders for foundry moulds and cores. Accordingly the concentration of alkali metal silicate and the ratio silica:alkali will preferably be selected from those values that are known to be conventionally suitable for alkali metal silicate binder solutions.

A method according to the invention of making foundry moulds or cores comprises mixing sand or other inert particulate material with the aqueous binder solution, shaping the mix into the desired mould or core and then curing the binder.

The impure silica powder used in the invention is a cheap by-product of various industrial processes. For instance the production of ferrosilicon alloys by electric smelting is accompanied by the production of silicon monoxide fume which oxidises to silica fume and is condensed on filters in the conventional way. The silica is collected as a fine powder and is suitable for use in this invention. In general, suitable impure powders can be collected from the exit gases from the ferroalloy industry and other industries using silicon metal, for instance the manufacture of silicon and silicochromium alloys.

The impure powder will generally contain at least 2% impurities but will generally have a silica content of at least 80%. Generally it contains at least 0.5% impurities that are insoluble in the aqueous alkali. The amount of insoluble impurities is generally below 10% and typically is from 1 to 5%. In addition to the insoluble impurities, the impure fume may also contain impurities that are soluble in aqueous alkali. The amount of these also is generally at least 0.5% but below 10%.

Insoluble materials generally include carbon, and when the solution is to be used as a foundry binder it is particularly desirable that carbon should be present. The amount may be at least 0.2%, generally at least 0.5%, by weight based on the weight of powder. Generally the amount is below 3% although it may be higher, for instance up to 5%, by weight based on the weight of powder. Other insoluble impurities that may be present include sulphur, magnesium oxide, ferric oxide and other compounds of magnesium or iron. The amount of any such impurity that is present is often 0.1% by weight or more (based on the weight of the powder), but is generally below 3% by weight although magnesium oxide may be present in larger amounts, for instance up to 5%.

Typical soluble impurities include alumina and compounds of sodium and potassium, all of which may be present in amounts of at least 0.1%. The amount of alumina is generally below 2% but higher amounts, for instance up to 5% (measured as the oxide), may be present as compounds of sodium or potassium.

The powder will have a high specific surface area. For instance generally it has a specific surface area of at least 5, and generally at least 10, m$^2$/gm for instance between 15 and 25 m$^2$/gm. Generally substantially all the silica powder has a particle size less than 1 micron, and usually less than 0.5 microns and preferably at least 95% of the fume has a particle size less than 0.3 microns.

The aqueous alkali is normally sodium hydroxide but other alkali metal hydroxides, such as potassium hydroxide can be used. Also other alkalis, for instance sodium or other alkali metal silicate solution, may be used. Thus the silica content of an alkali metal silicate solution can be increased by dissolving in it the described impure silica powder.

The ratio of alkali metal to silica is selected by appropriate selection of the proportions of alkali and silica powder. As is conventional, the mean weight ratio $SiO_2:Na_2O$ for foundry application is generally 2:1 to 2.5:1 but in some instances may be as high as 3.5:1 and possibly as low as 1.6:1.

The concentration of alkali metal silicate in the binder solution may be conventional and is thus generally from 30 to 60%, must usually 40 to 50%. The amount of water in the solution is thus generally from 40 to 70%, most usually 50 to 60%. All this water may be introduced with the silica and alkali or a more concentrated solution may be formed and then diluted by addition of water.

The solution is formed merely by mixing the alkali and silica. The silica dissolves quicker at elevated temperatures than at ambient temperatures and so the mixture is preferably formed at a temperature between 40° C. and boiling, typically 60° to 80° C. Preferably the mixture is kept stirred. Total solution of the silica under these conditions will occur quite quickly but preferably the heating and stirring is applied for at least 10 minutes, for instance up to one hour or even two hours, in order to ensure complete dissolution.

An essential feature of the invention is that suspending agent is included in the solution to hold the insoluble impurities in stable suspension. The amount of suspending agent is generally below 1%, most usually 0.01 to 0.5%, typically 0.05 to 0.2%, based on the weight of the solution. The suspending agent is a material of the type that will hold soil or other particulate material in suspension in aqueous solutions and must of course be a material that is inert to the alkali metal silicate solution. Conventional surfactants therefore are not suitable since they do not suspend soil in solution, and in particular do not hold the described particulate impurities in stable suspension. If surfactant-type materials are used instead of suspending agents it is observed that particulate impurities settle from the solution within a few hours, and thus the solution does not contain a stable suspension.

The suspending agent should not function by causing a significant increase in viscosity since if the suspending agent does make a significant difference to the viscosity of the solution, either initially or on storage, the solution will be unusable as a foundry binder solution because it will be too viscous to mix adequately with the sand. Some increase in viscosity is tolerable provided it is not too great. Generally the increase in viscosity is from 20 to 70%, most preferably about 30 to 55%.

The suspending agent is generally selected from natural materials such as gums, e.g., guar gum, flour, cerals and other starches, modified natural materials such as celluloses, especially hydroxyalkyl cellulose, alkyl cellulose and carboxyalkyl cellulose (generally introduced as the sodium salt) and medium molecular weight, water soluble, synthetic polymeric materials such as polyacrylic acids and their esters (and alkali salts of the acids) having a medium molecular weight generally in the range 5,000 to 100,000, most preferably 10,000 to 50,000. The alkyl groups in the named celllulose derivatives are generally $C_{1-4}$ groups, preferably methyl or ethyl, e.g. hydroxyethyl or carboxymethyl cellulose.

The suspending agent may be included in the aqueous medium into which the silica is dissolved or may be subsequently added and thoroughly stirred into the solution.

The resultant product can be used in the same way as conventional alkali metal silicate binders. For instance it may be mixed with sand and shaped into the desired mould or core and then cured by passing carbon dioxide through it. Alternatively a curing agent may be included in the mixture. Normally the curing agent is an ester or ester mixture selected from triacetin, diacetin and ethylene glycol diacetate, or powdered dicalcium silicate, or powdered ferrosilicon.

We have surprisingly found that when foundry moulds or cores are made using the novel solutions the resultant moulds or cores have improved early compression strength compared to the strength obtainable using conventional silicate solutions free of impurities. Thus the strength obtained in the invention develops quicker than the strength using conventional solutions. This is a very valuable property as it permits earlier handling and use of the moulds or cores.

After a mould or core has been used it is generally necessary to break it down again, this generally being termed "sand breakdown". To permit breakdown it is desirable that the binder should be relatively weak after use and we have surprisingly found that the presence of the suspended impurities reduces the compression strength after use and thus facilitates sand breakdown. Sand breakdown can be further improved by the addition of conventional sand breakdown additives such as glucose, dextrose, dextrin or sugars.

Some examples of the invention are now given. In each example the impure silica powder is a powder produced during the production of ferro-silicon alloys by electric smelting were collected in filters and analysed. Typical analyses and properties is as follows:

| | |
|---|---|
| $SiO_2$ | 86–92% |
| C | 0.8–2.0% |
| $Fe_2O_3$ | 0.3–1.0% |
| $Al_2O_3$ | 0.2–0.6% |
| $Na_2O$ | 0.8–1.8% |
| $K_2O$ | 1.5–3.5% |
| MgO | 0.3–3.5% |
| S | 0.2–0.4% |
| Ignition loss | 2.4–4.0% |
| Moisture | <1.0% |
| Particle size: | 20% < 0.05 μm |
| | 70% < 0.1 μm |
| | 95% < 0.2 μm |
| | 99% < 0.5 μm |
| Specific Surface | 18–22 m$^2$/gm |
| Specific Gravity | 2.2 t/m$^3$ |

-continued

| Bulk Density uncompacted | 0.2–0.3 t/m³ |
| Bulk Density compacted | 0.4–0.6 t/m³ |

EXAMPLE 1

31.7 parts by weight of such a powder having a silica content of 92% were mixed with 36 parts by weight sodium hydroxide liquor containing 47.4% sodium hydroxide and 32.3 parts by weight water containing 0.5% polyacrylic acid m.w. 27,000. The mixture was heated to near boiling (100° C.) and kept stirred for about one hour when it was allowed to cool. The product was a stable black liquor having a $SiO_2:Na_2O$ ratio of about 2.2 and having about 42.4% solids content.

It could be handled and pumped through the apparatus conventionally used for handling alkali metal silicate binder solutions without any coating or sludge problems occurring.

When tested as a binder in the carbon dioxide process of forming sand moulds its binding properties were found to be at least as good as those of a comparitive 2.2 ratio 42.4% sodium silicate solution made by the conventional method of fusing sodium carbonate and sand.

EXAMPLE 2

Production of Sodium Silicate Solution:

47.7 kg water, 1.5 kg hydroxyethyl cellulose, 546 kg 47% aqueous NaOH solution, and 475.5 kg impure silica powder of the above stated composition were mixed in a mild steel reaction vessel equipped with stirrer and heating coils. Within the vessel an exothermic reaction was initiated with the result that within 30 minutes the temperature in the vessel had increased from 10° C. to 45° C. Heat was supplied to the vessel for the next 30 minutes, raising the temperature to 80° C. Heating was discontinued, but the temperature was maintained at 80° C. by the exothermic reaction and mixing was continued for the next 2 hours, after which the fluid was poured off into mild steel drums and allowed to cool to ambient temperature without use of cooling means.

The product thus obtained constituted a stable aqueous solution of sodium silicate having a $SiO_2:Na_2O$ ratio of about 2.2, a solids content of 42.4%, a specific gravity of 1.497 at 20° C., 48° Be, and a viscosity of 195 cp.

EXAMPLE 3

Standard foundry test methods were used to determine build up of compression strength. Sand mixes were prepared using 3.5% of binder added to 100% Chelford 50 sand. Standard 50 mm test pieces were prepared and gassed with $CO_2$ and for 30 seconds at 4.5 l/min and the compression strength of the stored test pieces determined at the intervals shown in Table 1. The process was conducted using two different binder solutions, solution A being the solution obtained in Example 2 and solution B using a commercial grade of sodium silicate solution that was free of impurities. The results obtained were as follows:

TABLE 1

| | Compression Strength (kNm$^{-2}$) | | | | |
|---|---|---|---|---|---|
| Binder | 2 min | 30 min | 60 min | 120 min | 24 hours |
| A | 698 | 900 | 942 | 851 | 1828 |
| B | 509 | 732 | 725 | 1047 | 2174 |

EXAMPLE 4

The sand breakdown properties of a binder follow from the resistance of the binder to the high temperatures prevailing during casting. The different parts of the binder are exposed to different temperatures and so a meaningful way of determining sand breakdown in the laboratory is to prepare products as in Example 3, allow them to stand for 24 hours and then heat samples of the products for 15 minutes at a wide range of temperatures. This was done on the products obtained in Example 3 with the results shown in Table 2.

TABLE 2

| Temperature | Retained Compression Strength (kNm$^{-2}$) | |
|---|---|---|
| °C. | A | B |
| Room Temp. | 1828 | 2174 |
| 100 | 1995 | 1988 |
| 200 | 1037 | 4915 |
| 300 | 889 | 2495 |
| 400 | 1077 | 3106 |
| 500 | 758 | 1470 |
| 600 | 568 | 1341 |
| 700 | 343 | 497 |
| 800 | 573 | 650 |
| 900 | 1722 | 3390 |
| 1000 | 1920 | 2347 |

Tables 1 and 2 thus show the surprising phenomena that compression strength both builds up and breaks down more rapidly than with the commercial pure material.

EXAMPLE 5

The effect of various additives on the viscosity of the solution and on the stability and settling rate of the solution was observed. Thus solutions were made generally in accordance with Example 2 except that one solution was made with no additive, one with 0.1% hydroxyethyl cellulose and others with 0.1% of various surfactants. It was observed that all the solutions containing surfactant developed a distinctive black sludge at the bottom of the solution within a few hours and solutions containing no additive developed a sludge even more rapidly. The sample containing hydroxyethyl cellulose did not release any sludge. To confirm this gravimetric analysis was conducted on samples extracted from near the base of the solution and near the top of the solution.

Viscosities of freshly made solutions were measured at 14° C. on a Shandon VT/01 Rotary Viscometer. The values obtained are shown in Table 3.

TABLE 3

| Additive | % Insolubles in top sample | % Insolubles in bottom sample | Viscosities cP. |
|---|---|---|---|
| No suspending agent | 1% | 3% | 135 |
| Hydroxyethyl-cellulose | 2% | 2% | 195 |
| Sodium dodecyl benzene sulphonate | 1% | 3% | 145 |
| Phosphate ester of fatty alcohol ethoxylate | 1% | 3% | 160 |
| Sodium 2-ethyl hexyl sulphate | 1% | 3% | 152 |
| Sodium lauryl ether sulphate | 1% | 3% | 163 |
| Alcohol ethoxy- | 1% | 3% | 148 |

TABLE 3-continued

| Additive | % Insolubles in top sample | % Insolubles in bottom sample | Viscosities cP. |
| --- | --- | --- | --- |
| late | | | |

We claim:

1. In a method of making foundry moulds or cores by mixing sand or other particulate material with an aqueous binder solution, shaping the mix into the desired mould or core and then curing the binder, the improvement consisting of using as a binder an aqueous alkali metal silicate solution which has been made by dissolving silica powder obtained by condensation during the production of ferrosilicon and contains impurities that are insoluble in aqueous alkali and that include carbon, and the impurities are suspended in the solution as a stable suspension by means of from 0.01 to 1% by weight of a suspending agent selected from the group consisting of celluloses and starches.

2. In an aqueous alkali metal silicate solution suitable for use as a binder for foundry moulds and cores and which has been made by a method comprising dissolving a silica powder in aqueous alkali, the improvement consisting in that the silica powder is silica condensed during production of ferrosilicon and contains impurities that are insoluble in aqueous alkali and that include carbon, and the impurities are suspended in the solution as a stable suspension by means of from 0.01 to 1% by weight of a suspending agent selected from celluloses and starches.

3. In the solution according to claim 1 wherein the silica powder consists of at least 80% by weight silica and at least 0.5% by weight impurities insoluble in the alkali and contains at least 2% by weight total impurities.

4. In the solution according to claim 1 wherein the solution is for use as a binder for foundry moulds and cores, has a weight ratio $SiO_2:Na_2O$ of 1.6:1 to 3.5:1, and has an alkali metal silicate concentration of 30 to 60% by weight.

5. In the solution according to claim 1 wherein the amount of carbon is at least 0.5% based on the weight of the powder.

6. In the solution according to claim 1 wherein the suspending agent is hydroxyethyl cellulose or carboxymethyl cellulose.

7. In an aqueous alkali metal silicate solution suitable for use as a binder for foundry moulds and cores and which has been made by a method comprising dissolving a silica powder in aqueous alkali, the improvement consisting in that the silica powder is silica condensed during production of ferrosilicon and contains at least 80% by weight silica, at least 2% by weight total impurities, and at least 0.5% by weight impurities insoluble in alkali and that include carbon, said impurities being suspended in the solution as a stable suspension by means of from about 0.01 to 1% by weight of a suspending agent selected from celluloses and starches, the resulting solution having a viscosity which is not more than 70% greater than the viscosity of the solution without the suspending agent.

* * * * *